(12) United States Patent
Ishikawa et al.

(10) Patent No.: US 7,718,709 B2
(45) Date of Patent: May 18, 2010

(54) OIL-IN-WATER EMULSION COMPOSITION

(75) Inventors: Makoto Ishikawa, Yokkaichi (JP);
Hironobu Nanbu, Yokkaichi (JP); Lekh Raj Juneja, Yokkaichi (JP); Nobuhiro Ogasawara, Tokyo (JP); Masatoshi Nakano, Tokyo (JP); Ryoichi Akahoshi, Tokyo (JP)

(73) Assignees: Taiyo Kagaku Co., Ltd., Yokkaichi (JP); Kabushiki Kaisha Yakult Honsha, Tokyo (JP)

( * ) Notice: Subject to any disclaimer, the term of this patent is extended or adjusted under 35 U.S.C. 154(b) by 366 days.

(21) Appl. No.: 10/518,926

(22) PCT Filed: Jun. 26, 2003

(86) PCT No.: PCT/JP03/08068

§ 371 (c)(1),
(2), (4) Date: Dec. 23, 2004

(87) PCT Pub. No.: WO2004/003119

PCT Pub. Date: Jan. 8, 2004

(65) Prior Publication Data

US 2006/0058401 A1    Mar. 16, 2006

(30) Foreign Application Priority Data

Jun. 28, 2002    (JP) .............................. 2002-191442

(51) Int. Cl.
*A23D 7/005* (2006.01)
*B01F 3/08* (2006.01)

(52) U.S. Cl. ......................................... 516/73; 516/75

(58) Field of Classification Search .................. 516/73, 516/75

See application file for complete search history.

(56) References Cited

U.S. PATENT DOCUMENTS

| 4,379,755 | A  | * | 4/1983 | Yamada et al. ................. 516/73 |
| 6,193,986 | B1 | * | 2/2001 | Sakurada ..................... 424/401 |
| 6,346,289 | B1 | * | 2/2002 | Nasaka et al. ................ 426/610 |
| 2002/0028280 | A1 | * | 3/2002 | Yamaguchi et al. ......... 426/590 |
| 2003/0021878 | A1 | * | 1/2003 | Nunes et al. ................. 426/601 |
| 2003/0035859 | A1 | * | 2/2003 | Takahashi et al. ............. 426/57 |
| 2004/0077604 | A1 | * | 4/2004 | Lichtenberger .............. 514/78 |

FOREIGN PATENT DOCUMENTS

| JP | 5-287294 A | | 11/1993 |
| JP | 7-115901 | | 5/1995 |
| JP | 07115901 A | * | 5/1995 |
| JP | 07-327604 A | | 12/1995 |
| JP | 08-187051 A | | 7/1996 |
| JP | 08-0228678 A | | 9/1996 |
| JP | 09-154484 A | | 6/1997 |
| WO | WO 01/058279 A1 | * | 8/2001 |
| WO | WO 0158279 A1 | * | 8/2001 |

OTHER PUBLICATIONS

National Soybean Engineering and Technology Center, "Production of Powdered Fat or Oil by Microcapsule Technology", *Soybean Bulletin*, 2000, No. 2, pp. 21 and 25.

* cited by examiner

*Primary Examiner*—Timothy J. Kugel
(74) *Attorney, Agent, or Firm*—Birch, Stewart, Kolasch & Birch, LLP

(57) ABSTRACT

A fat or oil composition comprising a polyvalent unsaturated fatty acid component and an emulsifying agent having an HLB of 4 or less, wherein the amount of the emulsifying agent having an HLB of 4 or less is from 25 to 300 parts by weight, based on 100 parts by weight of the polyvalent unsaturated fatty acid component. The fat or oil composition can be used as an oil-in-water droplet emulsion composition. The fat or oil composition and the oil-in-water droplet emulsion composition can be used for foodstuff and the like.

4 Claims, No Drawings

OIL-IN-WATER EMULSION COMPOSITION

TECHNICAL FIELD

The present invention relates to a fat or oil composition and an oil-in-water droplet emulsion composition using the composition, and foodstuff containing these. More specifically, the present invention relates to a fat or oil composition in which an odor distinctive to a fat or oil containing a polyvalent unsaturated fatty acid component having a physiological activity, such as docosahexaenoic acid (hereinafter referred to as DHA), docosapentaenoic acid (hereinafter referred to as DPA), eicosapentaenoic acid (hereinafter referred to as EPA), or arachidonic acid (hereinafter referred to as ARA) is masked and an oil-in-water droplet emulsion composition using the composition, and foodstuff comprising these compositions.

BACKGROUND ART

Polyvalent unsaturated fatty acids such as DHA, DPA, EPA and ARA have been known to be contained richly as a fat or oil in fish such as tuna, yellowtail, mackerel, eel or sardine, an animal living in the sea such as seal, or a microorganism. These polyvalent unsaturated fatty acids, for instance, exhibit various physiological activities such as action for suppressing platelet aggregation, action for lowering neutral lipid in blood, action for ameliorating learning and memorization and action for ameliorating allergy.

However, these polyvalent unsaturated fatty acids are very highly likely to be oxidized, so that the deterioration of the tastes takes place, so that unpleasant odor and taste are exhibited in some cases. Therefore, in a case where a fish oil is utilized as food, various methods of preventing generation of unpleasant odors and oxidization have been proposed.

As the methods, there have been known, for instance, a method of coating a fish oil with a protein hydrolysate and a milk solid content (see, for instance, Japanese Patent Laid-Open No. Hei 5-98286), a method of blending a fish oil in a powdered milk for infant rearing (see, for instance, Japanese Patent Laid-Open No. Hei 1-80250), a method of wrapping a fish oil with cyclodextrin (see, for instance, Japanese Patent Laid-Open No. Hei 4-178348), a method of improving storage ability of a powdered milk with vitamin C (see, for instance, Japanese Patent Laid-Open No. Hei 4-178349), a method of masking a fish oil with a lime flavor (see, for instance, Japanese Examined Patent Publication No. Sho 60-18382), a method of masking a fish oil with a yogurt flavor or milk flavor (see, for instance, Japanese Patent Laid-Open No. Hei 6-68), a method of blending a fish oil in a fermented milk (see, for instance, Japanese Patent Laid-Open No. Hei 6-90662), a method of blending a fish oil in ice cream (see, for instance, Japanese Patent Laid-Open No. Sho 63-216435) and the like.

In addition, besides those mentioned above, in order to improve the storage ability of a fish oil, there has been reported a method of suppressing oxidation deterioration comprising adding an antioxidant such as tocopherol or a tea extract (see, for instance, Gekkan Fudokemikaru (Monthly Issue Food Chemical), K.K. Shokuhin Kagaku Shinbun, 1990, 5, 54-60).

However, although various methods have been proposed as mentioned above, the generation of the taste of unpleasant fish odor cannot be satisfactorily suppressed in these methods.

For instance, there is a defect in the method of coating a fish oil with a protein hydrolysate and a milk solid content, the method of blending a fish oil in a powdered milk for infant rearing, and the method of wrapping a fish oil with cyclodextrin that the generation of an unpleasant odor is caused due to the oxidation of the polyvalent unsaturated fatty acid during storage.

In addition, as to the method of improving storage ability of a powdered milk with vitamin C, hardly any deodorizing effects can be expected. Also, in the method of masking a fish oil with a flavor, there is not only a defect that an unpleasant odor is felt after the intake, but also a defect that the application range to foodstuff is limited.

In the method of blending a fish oil in a fermented milk, there is a defect that since the fish odor is masked with an odor owned by the fermented milk, an unpleasant odor is felt after the intake.

In the method of blending a fish oil in ice cream, since the ice cream is subjected to frozen storage, the progress of the oxidation is suppressed to a certain extent, but some unpleasant odors are felt upon intake possibly due to the aggregation of the fish oil in the demulsification upon the preparation. Also, in the masking with a fermented milk, ice cream or the like, there is a defect that its application is limited.

Furthermore, in the method of adding tocopherol or a tea extract to a fish oil, hardly any deodorizing effects are obtained even when tocopherol is added at 0.1%. Also, if the tea extract is added in an amount of 0.1%, the oxidation degradation effects disappear in a short period of time, even though the oxidation degradation can be suppressed more than tocopherol, thereby showing elevation of peroxide value. Therefore, the effects are not satisfactory.

The present invention has been accomplished in view of the prior arts mentioned above. An object of the present invention is to provide a fat or oil composition which hardly generates an unpleasant odor or foreign taste even when a polyvalent unsaturated fatty acid such as DHA, DPA, EPA or ARA, an ester thereof or the like is formulated in foodstuff, and an oil-in-water droplet emulsion composition using the composition, and foodstuff containing these compositions.

DISCLOSURE OF INVENTION

The present invention relates to:
(1) a fat or oil composition comprising a polyvalent unsaturated fatty acid component and an emulsifying agent having an HLB of 4 or less, wherein the amount of the emulsifying agent having an HLB of 4 or less is from 25 to 300 parts by weight, based on 100 parts by weight of the polyvalent unsaturated fatty acid component;
(2) foodstuff comprising the above-mentioned fat or oil composition;
(3) an oil-in-water droplet emulsion composition comprising the above-mentioned fat or oil composition and a polyglycerol fatty acid ester; and
(4) foodstuff comprising the above-mentioned oil-in-water droplet emulsion composition.

BEST MODE FOR CARRYING OUT THE INVENTION

One of great features of the fat or oil composition of the present invention resides in that a fat or oil composition comprises a polyvalent unsaturated fatty acid component and an emulsifying agent having an HLB of 4 or less, wherein the amount of the emulsifying agent having an HLB of 4 or less is from 25 to 300 parts by weight, based on 100 parts by weight of the polyvalent unsaturated fatty acid component. As described above, in the fat or oil composition of the present invention, since the polyvalent unsaturated fatty acid component and the emulsifying agent having an HLB of 4 or less are contained in a specified ratio, there are exhibited some excellent effects that an unpleasant odor distinctive to the polyvalent unsaturated fatty acid component is hardly generated, and that the reoccurrence of the unpleasant odor can be suppressed even when the composition is stored over a long period of time.

It is considered that the reason why the unpleasant odor distinctive to the polyvalent unsaturated fatty acid component is hardly generated in the fat or oil composition of the present invention is probably due to the fact that the generation of odor from the polyvalent unsaturated fatty acid component contained in the fat or oil composition of the present invention is suppressed by the emulsifying agent having an HLB of 4 or less.

In addition, in the oil-in-water droplet emulsion composition of the present invention, a polyglycerol fatty acid ester is contained together with the above-mentioned fat or oil composition. It is considered that the deterioration of the polyvalent unsaturated fatty acid component is suppressed because the contact of the polyvalent unsaturated fatty acid component existing in the inner portion of the particles with an external odor-causing substance can be avoided by allowing the polyglycerol fatty acid ester to exist on the surface of the emulsion particles so as to incorporate the polyvalent unsaturated fatty acid component.

Since the oil-in-water emulsified composition of the present invention comprises a polyvalent unsaturated fatty acid and a specified emulsifying agent in a given ratio, there is an advantage that the lowering of the taste can be prevented without requiring a complicated multi-step emulsification process as in the inventions described in the above-mentioned publications.

In general, a polyvalent unsaturated fatty acid is a fatty acid having a plural number of carbon-carbon double bonds in its molecule, and has a bent molecular structure.

Also, the polyvalent unsaturated fatty acid forms an ester bond with glycerol to exist in the form of a triglyceride. Therefore, there have been known that the intramolecular gap becomes larger due to steric hindrance of the polyvalent unsaturated fatty acid having a bent molecular structure, thereby increasing the possibility of contact of the oxidation promoting factor to the double bond.

On the contrary, in the present invention, the specified lipophilic emulsifying agent (HLB being 4 or less) is used in a given ratio in the intramolecular gap of the polyvalent unsaturated fatty acid. Therefore, it is considered that the molecular density is increased, so that the contact with the oxidation promoting factor can be suppressed, whereby suppressing the generation of an odor based on the oxidation.

This fact is clear from the determination results of the density of the fat or oil composition. In other words, since the fat or oil composition of the present invention comprises a specified emulsifying agent in a given amount to the fat or oil, it is thought that the fat or oil composition has a density higher than a usual composition, and a dense matrix structure. For instance, while the density of the fat or oil composition obtained is 0.93 in a case of the polyvalent unsaturated fatty acid (PUFA) alone, the density of the fat or oil composition of the present invention is 0.93 or more. Here, the density of the fat or oil of the present invention is preferably 0.96 or more, more preferably 0.98 or more, even more preferably 1.00 or more.

Here, the means of determining the density of the fat or oil composition is not particularly limited. For instance, a vessel having a given volume (for instance, a volumetric flask of which weight is known) is charged with a given volume of a fat or oil composition, and the density can be simply obtained by determining the volume and weight of the charged vessel.

As described above, since both the fat or oil composition and the oil-in-water droplet emulsion composition of the present invention can suppress an unpleasant odor ascribed to the polyvalent unsaturated fatty acid component for a long period of time, these compositions can be suitably used for foodstuff or the like.

The polyvalent unsaturated fatty acid component includes polyvalent unsaturated fatty acids, salts of polyvalent unsaturated fatty acids, polyvalent unsaturated fatty acid esters and the like. These components may be used alone or in admixture of two or more kinds.

The polyvalent unsaturated fatty acid includes, for instance, DHA, DPA, EPA, ARA and the like. These can be used alone or in admixture of two or more kinds.

The salt of the polyvalent unsaturated fatty acid includes, for instance, alkali metal salts of the polyvalent unsaturated fatty acids such as sodium salts and potassium salts of the polyvalent unsaturated fatty acids, alkaline earth metal salts of the polyvalent unsaturated fatty acids such as magnesium salts of the polyvalent unsaturated fatty acids, and the present invention is not limited to those exemplified above.

The polyvalent unsaturated fatty acid ester includes, for instance, esters formed between a polyvalent unsaturated fatty acid and a monohydric alcohol such as methanol or ethanol, a polyhydric alcohol such as glycerol or sucrose, or other components having hydroxyl groups, and the present invention is not limited to those exemplified above.

In the present invention, the polyvalent unsaturated fatty acid component can be directly used alone. Alternatively, as long as the polyvalent unsaturated fatty acid component is contained, a substance containing the polyvalent unsaturated fatty acid component can be used.

Representative examples of the substance containing the polyvalent unsaturated fatty acid component include a fat or oil containing the polyvalent unsaturated fatty acid component. Specific examples of the fat or oil containing the polyvalent unsaturated fatty acid component include, for instance, fats and oils contained in fish such as tuna, yellowtail, mackerel, eel, sardine, horse mackerel, mackerel pike, and Pacific herring; animals living in the sea such as seal; microorganisms; and the like. The fat or oil may be purified by extraction or the like as occasion demands. The purification can be carried out, for instance, by purification using activated clay or activated carbon, steam deodorization, column purification or the like. When the purification is carried out as described above, a fat or oil having excellent taste can be obtained.

In addition, the substance containing the polyvalent unsaturated fatty acid component may be those prepared by adding a polyvalent unsaturated fatty acid component to a fat or oil. In that case, the kinds of the fat or oil are not particularly limited, and any of those can be arbitrarily used as long as it is an edible oil. The edible oil includes, for instance, palm oil, rice oil, cotton seed oil, rapeseed oil and the like, among which palm oil is preferable.

Specific examples of the emulsifying agent having an HLB of 4 or less, contained in the fat or oil composition of the present invention include fatty acid esters having an HLB of 4 or less.

In the fatty acid ester having an HLB of 4 or less, the kinds of the fatty acids constituting the fatty acid ester are not particularly limited. Examples of the fatty acid include a short-chain fatty acid having 4 to 6 carbon atoms, a medium-chain fatty acid having 8 to 10 carbon atoms, a long-chain fatty acid having 12 or more carbon atoms, and the like.

Among them, the short-chain fatty acid having 4 to 6 carbon atoms is preferable, and butyric acid, which has 4 carbon atoms, is more preferable. Here, the HLB is calculated from the molecular weight of the hydrophilic group and the hydrophobic group.

Representative examples of the fatty acid ester having an HLB of 4 or less includes sucrose fatty acid esters having an HLB of 4 or less. A preferred representative example of the sucrose fatty acid ester includes sucrose acetate isobutyrate.

It is preferable that the ratio of the monoester bond in the entire ester bond in one molecule of the fatty acid ester having an HLB of 4 or less is 30% by mol or less, from the viewpoint of dispersibility.

The amount of the emulsifying agent having an HLB of 4 or less is from 25 to 300 parts by weight, preferably from 25 to 100 parts by weight, based on 100 parts by weight of the polyvalent unsaturated fatty acid component, from the viewpoint of allowing an odor ascribed to the polyvalent unsaturated fatty acid component not to leak externally, and from the viewpoint of preventing the deterioration.

The fat or oil composition of the present invention can be obtained by homogeneously mixing a polyvalent unsaturated fatty acid component and an emulsifying agent having an HLB of 4 or less, and adding an additive thereto as occasion demands.

The fat or oil composition of the present invention thus obtained can be suitably used for foodstuff as described later.

The oil-in-water droplet emulsion composition of the present invention comprises the above-mentioned fat or oil composition and a polyglycerol fatty acid ester.

The polyglycerol fatty acid ester in the present invention is not particularly limited.

The polyglycerol fatty acid ester is preferably a fatty acid having 8 to 18 carbon atoms, more preferably a fatty acid having 14 to 18 carbon atoms from the viewpoint of emulsification property. The average degree of polymerization of glycerol in the polyglycerol fatty acid ester is preferably from 3 to 10, more preferably from 4 to 6.

Preferred examples of the polyglycerol fatty acid ester include pentaglycerol trimyristate, pentaglycerol dimyristate, pentaglycerol dioleate, hexaglycerol trimyristate, hexaglycerol tripalmitate, hexaglycerol tristearate, hexaglycerol trioleate, and polyglycerol fatty acid esters having different number of ester bonds, polyglycerol fatty acid esters having different degrees of polymerization of glycerol and the like. Among these, more preferred examples of the polyglycerol fatty acid ester include pentaglycerol trimyristate, pentaglycerol dimyristate and pentaglycerol dioleate.

It is desired that the amount of the polyglycerol fatty acid ester is from 0.5 to 50 parts by weight, preferably from 1 to 20 parts by weight, based on 100 parts by weight of the above-mentioned fat or oil composition.

Incidentally, for the purpose of enhancing the coating effect of the polyvalent unsaturated fatty acid component with the polyglycerol fatty acid ester, there can be used, for instance, other emulsifying agent such as an organic acid ester of monoglycerol, a propylene glycol fatty acid ester, lecithin or enzymatically decomposed lecithin; a stabilizer such as a polysaccharide or starch; a protein such as a skim milk powder, caseinate or a saccharide; or a saccharide such as sugar or sorbitol within the range that does not inhibit the object of the present invention.

A preferred method for preparing an oil-in-water droplet emulsion composition of the present invention includes a method comprising homogeneously mixing the above-mentioned fat or oil composition, and the polyglycerol fatty acid ester which is warmed as occasion demands, with, for instance, a HOMO MIXER or the like. According to the above method, a continuous layer made from the polyglycerol fatty acid ester, which firmly coats the above-mentioned fat or oil composition can be formed.

Thus, the oil-in-water droplet emulsion composition of the present invention is obtained. The oil-in-water droplet emulsion composition of the present invention may be blended with other emulsifying agent for the purpose of enhancing the effect of coating the polyvalent unsaturated fatty acid component. In addition, the oil-in-water droplet emulsion composition of the present invention may be processed so as to, for instance, emulsify or disperse the composition in foodstuff upon use according to its purpose of use or applications.

In the oil-in-water droplet emulsified composition of the present invention, the average particle size of the emulsion particles is not particularly limited. It is desired that the average particle size is usually from 0.1 to 2.0 μm, preferably from 0.3 to 0.8 μm. In addition, in the emulsion particles, the thickness of the layer made from the polyglycerol fatty acid ester existing on its surface is not particularly limited. It is preferable that the thickness is such that the fat or oil composition existing in the inner portion of the emulsion particles is completely coated.

The oil-in-water droplet emulsion composition thus obtained can be suitably used in foodstuff.

The foodstuff of the present invention, as mentioned above, comprises the fat or oil composition or the oil-in-water droplet emulsion composition.

The above-mentioned foodstuff includes, for instance, bread; noodles such as wheat noodles (udon), buckwheat noodles (soba), and Chinese noodles (ramen); meat or fish pastes (surimi) such as ham, sausage, kamaboko fish paste, and chikuwa fish paste; dairy products such as cow's milk, adjusted powdered milk, fermented milk, lactic acid bacteria drink, yogurt, cheese, milk-based pudding, and ice cream; sweets such as cookies, cakes, pies, chocolates, and jelly; luxurious beverages such as cocoa and milk tea; fat and oil processed products such as butter, margarine, mayonnaise, and salad dressings; seasonings such as soybean paste (miso), gravy sauce, and sauce; fish flour; powder soup; baby foods; hospital diets such as therapeutic diet and orally taken liquid foods; cooked foods such as hamburger, curry roux, and croquette; various refreshing beverages; and the like, and the present invention is not limited only to those exemplified. Among them, cow's milk, fermented milk, yogurt and orally taken liquid foods are preferable.

The content of the fat or oil composition or the oil-in-water droplet emulsion composition in the foodstuff can be absolutely determined because the content differs depending upon the kinds of the foodstuff. Therefore, it is preferable that the content is properly determined depending upon the kinds of the foodstuff and the like.

Next, the present invention will be described more specifically on the bases of Examples, without intending to limit the present invention to Examples alone.

EXAMPLE 1

Preparation of Oil-in-Water Droplet Emulsion Composition

In order to prepare a lipophilic preparation liquid, 120 g of sucrose fatty acid ester (sucrose acetate isobutyrate, manufactured by Eastman Chemical, HLB: 1) and 30 g of a vegetable oil [trade name: M-6, manufactured by Taiyo Kagaku Co., Ltd.] were warmed and melted, and 280 g of 22% DHA-containing purified fish oil [manufactured by K.K. Maruha] was added thereto, and the mixture was sufficiently mixed. The density of the resulting mixture was 1.00 g/cm$^3$.

Next, in order to prepare a hydrophilic preparation liquid, 320 g of glycerol [manufactured by NOF Corporation], 30 g of pentaglycerol dimyristate [manufactured by Taiyo Kagaku Co., Ltd.] and 30 g of pentaglycerol dioleate [manufactured by Taiyo Kagaku Co., Ltd.] were warmed and melted, and the mixture was sufficiently mixed. After the temperature was adjusted so that the temperature of the resulting mixture falls between 45° to 55° C., 180 of ion-exchanged water was added thereto, and the mixture was further mixed.

The lipophilic preparation liquid obtained as mentioned above is gradually supplied into the hydrophilic preparation as obtained above, and pre-emulsified with a Homo Mixer at 12000 rpm for about 10 minutes. The pre-emulsified mixture was allowed to pass through an emulsifier set to have a pressure of 1.47×10$^7$ Pa (150 kgf/cm$^2$). As a result, 950 g of an emulsion having an average particle size of from 0.2 to 0.8 μm was obtained (yield: 95%).

EXAMPLE 2

In order to prepare a lipophilic preparation liquid, 80 g of sucrose fatty acid ester (sucrose acetate isobutyrate, manufactured by Eastman Chemical, HLB: 1) and 30 g of a vegetable oil [trade name: M-6, manufactured by Taiyo Kagaku Co., Ltd.] were warmed and melted, and 280 g of 22% DHA-containing purified fish oil [manufactured by K.K. Maruha] was added thereto, and the mixture was sufficiently mixed. The density of the resulting fat and oil composition was 0.98 g/cm$^3$.

EXAMPLE 3

In order to prepare a lipophilic preparation liquid, 280 g of sucrose fatty acid ester (sucrose acetate isobutyrate, manufactured by Eastman Chemical, HLB: 1) and 30 g of a vegetable oil [trade name: M-6, manufactured by Taiyo Kagaku Co., Ltd.] were warmed and melted, and 280 g of 22% DHA-containing purified fish oil [manufactured by K.K. Maruha] was added thereto, and the mixture was sufficiently mixed. The density of the resulting fat and oil composition was 1.05 g/cm$^3$.

COMPARATIVE EXAMPLE 1

One-hundred grams of water, 10 g of a glycerol fatty acid ester [trade name: SUNSOFT #8000, manufactured by Taiyo Kagaku Co., Ltd.], 20 g a glycerol fatty acid ester [trade name: SUNSOFT Q-182S, manufactured by Taiyo Kagaku Co., Ltd.], 10 g of enzymatically decomposed lecithin [trade name: "SUNLECITHIN A," manufactured by Taiyo Kagaku Co., Ltd.] and 2 g of tea extract [trade name: "SUNPHENON 100S," manufactured by Taiyo Kagaku Co., Ltd.] were added to 658 g of glycerol [manufactured by NOF Corporation], and Homo Mixer (3000 rpm, 5 minutes) was used at 60° C. to give a homogeneous glycerol/water/emulsifying agent/tea extract solution. Thereafter, the solution was cooled to 40° C., and 200 g of 22% DHA-containing purified fish oil [manufactured by K.K. Maruha] was then added thereto. The mixture was pre-emulsified with Homo Mixer (12000 rpm, 10 minutes). The pre-emulsified mixture was allowed to pass through an emulsifier set to have a pressure of 1.47×10$^7$ Pa (150 kgf/cm$^2$), to give a DHA-containing emulsion composition (Comparative Product 1). The density of the resulting mixture was 0.90 g/cm$^3$.

COMPARATIVE EXAMPLE 2

It is disclosed in Japanese Patent Laid-Open No. Hei 6-68 that a flavor serves to mask a fish odor. Therefore, Example described in the publication is followed-up, and named Comparative Example 2. Specifically, 80 g of a yogurt flavor was mixed with 920 g of 22% DHA-containing purified fish oil, to give Comparative Product 2. The density of the resulting mixture was 0.90 g/cm$^3$.

COMPARATIVE EXAMPLE 3

As control, only 22% DHA-containing purified fish oil was used (Comparative Product 3).

TEST EXAMPLE 1

Fifty grams of the composition obtained in Example 1 was added to 950 g of a commercially available cow's milk having milk fat of 3.5%, and the mixture was homogeneously mixed. The resulting mixture was warmed to 50° C., and a sensory test was conducted by 10 panelists. As a result, its taste was excellent, which was completely the same as the commercially available cow's milk. The results are shown in Table 1.

TEST EXAMPLE 2

Fifty grams of the composition obtained in Comparative Example 1 was added to 950 g of a commercially available cow's milk having milk fat of 3.5%, and the mixture was homogeneously mixed. The resulting mixture was warmed to 50° C., and a sensory test was conducted by 10 panelists. As a result, 2 out of the 10 panelists recognized fish odor as compared to the commercially available cow's milk. The results are shown in Table 1.

TEST EXAMPLE 3

Fifty grams of the composition obtained in Comparative Example 2 was added to 950 g of a commercially available cow's milk having milk fat of 3.5%, and the mixture was homogeneously mixed. The resulting mixture was warmed to 50° C., and a sensory test was conducted by 10 panelists. As a result, the panelists recognized fish odor as compared to the commercially available cow's milk. The results are shown in Table 1.

TEST EXAMPLE 4

Fifty grams of the composition obtained in Comparative Example 3 was added to 950 g of a commercially available cow's milk having milk fat of 3.5%, and the mixture was homogeneously mixed. The resulting mixture was warmed to 50° C., and a sensory test was conducted by 10 panelists. As a result, the panelists recognized fish odor as compared to the commercially available cow's milk. The results are shown in Table 1.

Here, the evaluations described in Tables 1 to 3 mean as the followings:

⊚: 9 to 10 individuals out of 10 did not recognize fish odor at all.

○: 7 to 8 individuals out of 10 did not recognize fish odor at all.

Δ: 5 to 6 individuals out of 10 did not recognize fish odor at all.

×: 0 to 4 individuals out of 10 did not recognize fish odor at all.

TABLE 1

| | Commercially Available Cow's Milk | Test Example 1 | Test Example 2 | Test Example 3 | Test Example 4 |
|---|---|---|---|---|---|
| Fish Odor | ◉ | ◉ | ○ | X | X |

TEST EXAMPLE 5

Fifty grams of the composition obtained in Example 1 was added to 950 g of a commercially available yogurt drink, and the mixture was homogeneously mixed. The resulting mixture was warmed to 40° C., and a sensory test was conducted by 10 panelists. As a result, its taste was excellent, which was completely the same as the commercially available yogurt drink. The results are shown in Table 2.

TEST EXAMPLE 6

Fifty grams of the composition obtained in Comparative Example 1 was added to 950 g of a commercially available yogurt drink, and the mixture was homogeneously mixed. The resulting mixture was warmed to 40° C., and a sensory test was conducted by 10 panelists. As a result, 2 out of the 10 panelists recognized fish odor as compared to the commercially available yogurt drink. The results are shown in Table 2.

TEST EXAMPLE 7

Fifty grams of the composition obtained in Comparative Example 2 was added to 950 g of a commercially available yogurt drink, and the mixture was homogeneously mixed. The resulting mixture was warmed to 40° C., and a sensory test was conducted by 10 panelists. As a result, the panelists recognized fish odor as compared to the commercially available yogurt drink. The results are shown in Table 2.

TEST EXAMPLE 8

Fifty grams of the composition obtained in Comparative Example 3 was added to 950 g of a commercially available yogurt drink, and the mixture was homogeneously mixed. The resulting mixture was warmed to 40° C., and a sensory test was conducted by 10 panelists. As a result, the panelists recognized fish odor as compared to the commercially available yogurt drink. The results are shown in Table 2.

TABLE 2

| | Commercially Available Yogurt | Test Example 5 | Test Example 6 | Test Example 7 | Test Example 8 |
|---|---|---|---|---|---|
| Fish Odor | ◉ | ◉ | ○ | X | X |

TEST EXAMPLE 9

Fifty grams of the composition obtained in Example 1 was added to 950 g of a commercially available orally taken liquid food, and the mixture was homogeneously mixed. The resulting mixture was warmed to 40° C., and a sensory test was conducted by 10 panelists. As a result, its taste was excellent, which was completely the same as the commercially available orally taken liquid food. The results are shown in Table 3.

TEST EXAMPLE 10

Fifty grams of the composition obtained in Comparative Example 1 was added to 950 g of a commercially available orally taken liquid food, and the mixture was homogeneously mixed. The resulting mixture was warmed to 40° C., and a sensory test was conducted by 10 panelists. As a result, 3 out of the 10 panelists recognized fish odor as compared to the commercially available orally taken liquid food. The results are shown in Table 3.

TEST EXAMPLE 11

Fifty grams of the composition obtained in Comparative Example 2 was added to 950 g of a commercially available orally taken liquid food, and the mixture was homogeneously mixed. The resulting mixture was warmed to 40° C., and a sensory test was conducted by 10 panelists. As a result, the panelists recognized fish odor as compared to the commercially available orally taken liquid food. The results are shown in Table 3.

TEST EXAMPLE 12

Fifty grams of the composition obtained in Comparative Example 3 was added to 950 g of a commercially available orally taken liquid food, and the mixture was homogeneously mixed. The resulting mixture was warmed to 40° C., and a sensory test was conducted by 10 panelists. As a result, the panelists recognized fish odor as compared to the commercially available orally taken liquid food. The results are shown in Table 3.

TABLE 3

| | Commercially Available Orally Taken Liquid Food | Test Example 9 | Test Example 10 | Test Example 11 | Test Example 12 |
|---|---|---|---|---|---|
| Fish Odor | ◉ | ◉ | ○ | X | X |

TEST EXAMPLE 13

(1) Preparation of Fermented Milk

A 20% by weight aqueous solution of the whole milk powder was sterilized at 130° C. for 3 seconds. One percent of each of *Bifidobacterium breve* Y1T4065 strain, *Bifidobacterium bifidum* Y1T4007 strain, and *Lactobacillus lactis* Y1T0168 strain was inoculated thereto, and the solution was fermented at 37° C. for 12 hours. Thereafter, the solution was homogenized with a homogenizer at 15 MPa, to give a fermented milk having a pH of 5.3.

(2) Preparation of Syrup Solution

Each of the raw materials was dissolved in warm water so as to have a concentration of 25% by weight palatinose, 7% by weight carrot juice, 0.03% by weight lactoferrin, and 0.5% by weight tricalcium phosphate, and the DHA-containing oil-in-water emulsion composition prepared in Example 1 was added thereto so as to have a DHA content of 0.05% by weight, and the resulting mixture was sterilized 120° C. for 3 seconds, to give 400 g of a syrup solution.

To a mixture of 600 g of the fermented milk and 400 g of the syrup solution thus obtained was added 0.1% by weight of a yogurt flavor [manufactured by K.K. Yakult Material] to give a manufactured article. The resulting manufactured article had an excellent taste without feeling any bitterness, astringency and the like.

TEST EXAMPLE 14

Fifty grams of fructose-glucose liquid sugar, 3 g of citric acid, 1 g of calcium lactate, 1 g of amino acids, 1 g of a sucrose fatty acid ester (sucrose stearate, HLB: 15), a generally commercially available emulsifying agent having a high HLB as an emulsifying agent for a DHA-containing composition, or 1 g of the DHA-containing oil-in-water emulsion composition obtained in Example 1, 1 g of flavor and 0.03 g of sucralose were dissolved in 943 g of water. The resulting solution was sterilized at 85° C. for 30 minutes. Thereafter, the sterilized mixture was cooled, and its taste was evaluated.

As a result, of the manufactured articles obtained, when the DHA-containing oil-in-water emulsion composition obtained in Example 1 was used, no fish odor was sensed at all, while when only the emulsifying agent having high HLB was used, the fish odor was sensed.

INDUSTRIAL APPLICABILITY

The fat or oil composition and the oil-in-water droplet emulsion composition of the present invention exhibit some effects that unpleasant odor or foreign taste is less likely to be generated even when a polyvalent unsaturated fatty acid such as DHA, DPA, EPA or ARA is formulated in foodstuff. Therefore, the fat or oil composition and the oil-in-water droplet emulsion composition of the present invention are those which have not be found so far, having very important industrial significance, and can be suitably used for various foodstuff which have been conventionally refrained from using.

The invention claimed is:

1. An oil-in-water emulsion composition comprising a fat or oil composition comprising
    a polyvalent unsaturated fatty acid component which is a fat or an oil obtained from a fish and
    sucrose acetate isobutyrate,
    wherein the amount of the sucrose acetate isobutyrate is from 25 to 300 parts by weight, based on 100 parts by weight of the polyvalent unsaturated fatty acid component and
    a polyglycerol fatty acid ester selected from the group consisting of pentaglycerol trimyristate, pentaglycerol dimyristate, pentaglycerol dioleate, hexaglycerol trimyristate, hexaglycerol tripalmitate, and hexaglycerol tristearate.

2. The oil-in-water emulsion composition according to claim 1, wherein the polyvalent unsaturated fatty acid component is at least one member selected from the group consisting of polyvalent unsaturated fatty acids, salts of polyvalent unsaturated fatty acids and polyvalent unsaturated fatty acid esters.

3. The oil-in-water emulsion composition according to claim 2, wherein the polyvalent unsaturated fatty acid is at least one member selected from the group consisting of docosahexaenoic acid, docosapentaenoic acid, eicosapentaenoic acid and arachidonic acid.

4. A foodstuff comprising the oil-in-water emulsion composition as defined in any one of claims 1 to 3.

\* \* \* \* \*